(No Model.)

L. MOSS.
RAILWAY CAR.

No. 589,215. Patented Aug. 31, 1897.

Witnesses:
C. W. Benjamin
W. A. Sands

Inventor:
Lincoln Moss
by Harold Binney
his Atty.

UNITED STATES PATENT OFFICE.

LINCOLN MOSS, OF NEW YORK, N. Y.

RAILWAY-CAR.

SPECIFICATION forming part of Letters Patent No. 589,215, dated August 31, 1897.

Application filed April 8, 1897. Serial No. 631,262. (No model.)

*To all whom it may concern:*

Be it known that I, LINCOLN MOSS, of the city and State of New York, have invented certain new and useful Improvements in Railway-Cars, of which the following is a description, referring to the accompanying drawings, which form a part of this specification.

One object of the invention is to produce a car which may be used for the first or motor car on electric, cable, or other roads, each end of the car being convertible at will into a cab or inclosure, affording the engineer or motorman plenty of room and preventing the intrusion of the passengers, which may be thrown open to allow the free entrance and exit of passengers into and out of the car and yet inclose and protect the apparatus for controlling the car.

Another object of the invention is to produce a car in which, quite apart from the question of convertibility, the controlling apparatus may be protected by the strength of the platform in the event of collision and may at all times leave the platform entirely clear and in no way interfere with the entrance and exit of passengers to and from either side of the car through the end entrance of the car.

Of course the invention may be applied to one or to both ends of a car and may be used on a car which is run as the first of a train or as a single car. Indeed the invention may be applied to the train as a whole.

My improvement in one of the preferred forms is illustrated in the accompanying drawings, which show, as an illustration, a car particularly adapted for electric railways, although the electric motor is not shown, its character and arrangement being immaterial to my invention.

Figure 1:
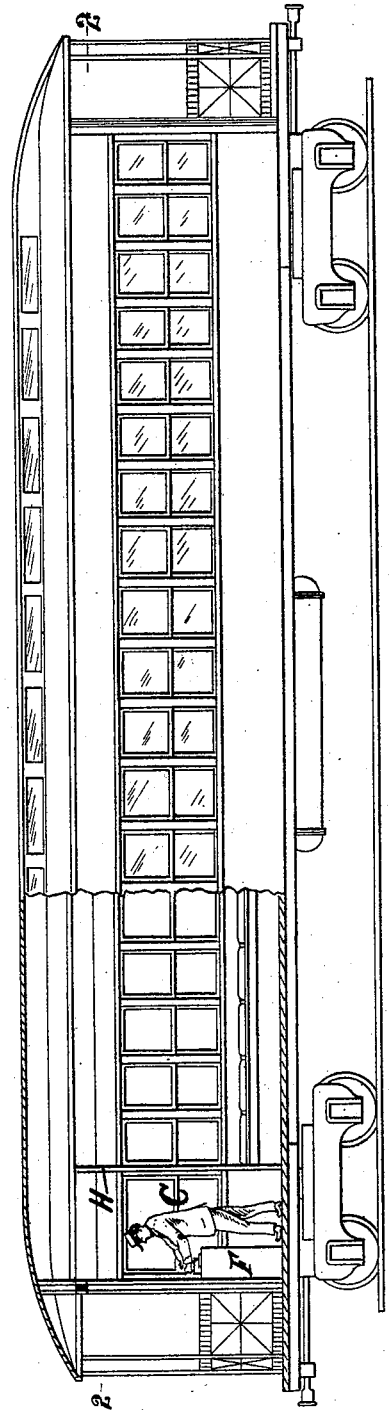
Figure 3:
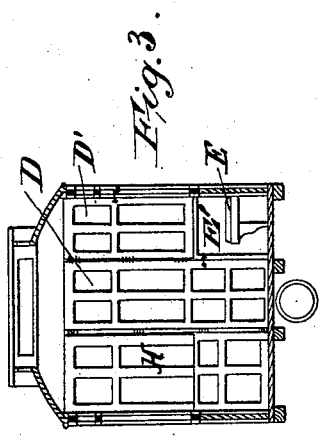
Figure 2:
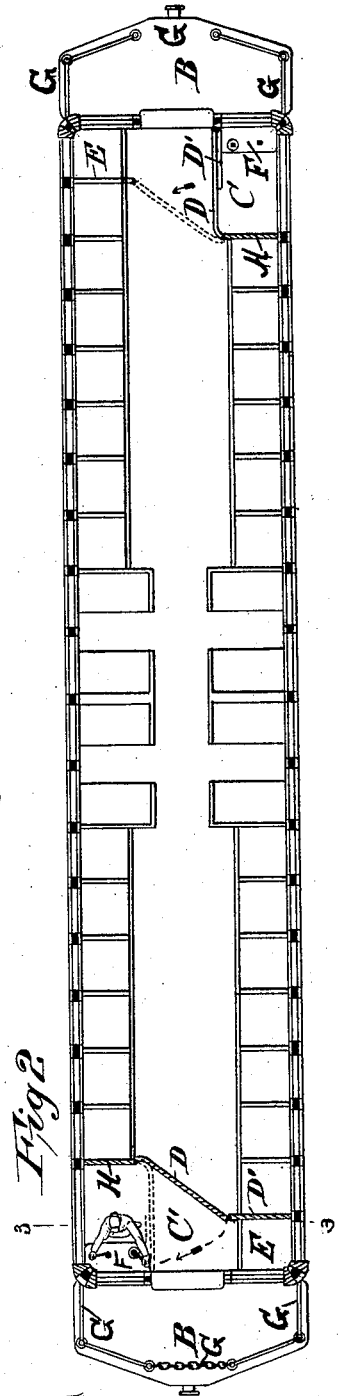

Figure 1 shows the car in side elevation broken away to show the interior at the end which is being used as a cab. Fig. 2 is a plan view of the interior of the car, the upper portion being removed on the section plane 2 2 of Fig. 1. Fig. 3 shows the interior of the cab, looking toward the rear from the plane 3 3 of Fig. 2.

Throughout the drawings like letters of reference indicate like parts.

Briefly stated, in the preferred form of my invention the cab when in use is separated from the rest of the car by a transverse partition which extends entirely across the car, affording the engineer or motorman plenty of space to operate. The space so inclosed is shown at the left end of the car in Figs. 1 and 2, (indicated by the letter C' in Fig. 2.) At the other end of the car, it will be seen, only the apparatus F is inclosed in a small compact compartment. The door of the car and the passage-way are entirely unobstructed and the portion E of the cab is utilized for seating passengers in the usual way. Passengers can enter by any one of the gates G and pass in and out as rapidly as they can in cars not provided with my invention.

The platforms are indicated at B. The various seats in the car are clearly shown in the drawings. One seat E at each end of the car is included in the cab when the cab is in use, as at C'. A swinging door or partition D is hinged to the stationary partition H. When closed, the partition D incloses the apparatus, as is shown at C to the right of Fig. 2, completely boxing it in from the rest of the car and occupying little, if any, more space than two of the ordinary seats. Under such circumstances the seat E may be used by the passengers. When the partition D, however, is swung to the position shown at the left hand of Fig. 2, a shorter section, which is hinged to the free edge of the partition D, is swung out and secured to the side of the car above the seat E, as shown in Figs. 2 and 3, completely partitioning off the end of the car and forming a cab of the shape shown at C' in Fig. 2. This sectional portion D' may extend down to the stationary portion shown at E' in Fig. 3. The motorman or engineer has plenty of room within this space, and as the platform in front of him is clear of passengers and the gates closed nothing obstructs his view through the windows about it. Preferably the window on his right will be a large clear pane, as shown, so that he can have an unobstructed view of the platforms of the successive stations. So there are several other details which will be determined solely by expediency and which are to that extent immaterial to my invention.

In a less-preferred form of my invention the smaller space, as shown at C at the right of Fig. 2, may constitute my cab when in use as well as when closed up and out of use. In either case it will be seen that the apparatus is located and inclosed at such a point that the platform is in front and therefore protects against destruction in collision, and that the side gates or entrances to the platform, the platform itself, the end entrance into the car, and the gate or entrance from one car-platform to the next are entirely unobstructed by my apparatus.

Having now fully set forth my invention, however, in its preferred forms, I claim as follows:

1. A railway-car provided with a convertible cab having a movable partition which completely incloses the apparatus when the apparatus is not in use and divides the cab from the remainder of the car when the apparatus is in use.

2. In a car provided with an entrance at the end, the stationary partition H, and a movable partition inclosing, with the stationary partition and the sides or walls of the car, a space at one side of the said entrance, the said movable partition adjustable to form a transverse partition across the said car, substantially as and for the purposes described.

3. In combination in a car, the stationary partition H, the partition or door D flexibly connected therewith, extending either across the car or longitudinally, at will, and the section D' flexibly connected to and extending from the said partition D transversely when desired, substantially as set forth.

4. In combination in a car, the platform and end entrance, the side entrances or gates opening into said platform and the controlling apparatus and inclosure therefor, back of the said gates and at one side of the said end entrance and platform, whereby all the said entrances are entirely unobstructed and whereby the said apparatus is protected from collisions by the said platform.

5. In combination in a car the platform, the gates or entrances thereto, and the controlling apparatus set back and entirely clear of the platform, substantially for the purposes set forth.

In testimony whereof I have hereunto set my hand.

LINCOLN MOSS.

Witnesses:
GEORGE H. SONNEBORN,
HAROLD BINNEY.